(12) United States Patent
Xu et al.

(10) Patent No.: US 8,140,700 B2
(45) Date of Patent: Mar. 20, 2012

(54) RELIABLE DELIVERY OF MULTI-CAST CONFERENCING DATA

(75) Inventors: Yikang Xu, Redmond, WA (US); Leonard Alan Collins, Carnation, WA (US); Lon-Chan Chu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 12/356,096

(22) Filed: Jan. 20, 2009

(65) Prior Publication Data
US 2009/0164648 A1 Jun. 25, 2009

Related U.S. Application Data

(62) Division of application No. 10/436,613, filed on May 13, 2003, now abandoned.

(51) Int. Cl.
*G06F 15/16* (2006.01)
(52) U.S. Cl. ........ 709/231; 709/204; 709/205; 709/206; 709/207; 709/230
(58) Field of Classification Search .................. 709/230, 709/231, 204–207
See application file for complete search history.

(56) References Cited

U.S. PATENT DOCUMENTS

| | | | |
|---|---|---|---|
| 5,519,704 A | 5/1996 | Farinacci et al. | |
| 5,905,871 A | 5/1999 | Buskens et al. | |
| 6,118,765 A | 9/2000 | Phillips | |
| 6,148,005 A | 11/2000 | Paul et al. | |
| 6,501,763 B1 | 12/2002 | Bhagavath et al. | |
| 6,505,253 B1 | 1/2003 | Chiu et al. | |
| 6,507,562 B1* | 1/2003 | Kadansky et al. | 370/216 |
| 6,526,022 B1 | 2/2003 | Chiu et al. | |
| 6,574,668 B1 | 6/2003 | Gubbi | |
| 6,693,907 B1 | 2/2004 | Wesley et al. | |
| 6,850,488 B1 | 2/2005 | Wesley et al. | |
| 6,937,597 B1 | 8/2005 | Rosenberg et al. | |
| 2002/0114302 A1* | 8/2002 | McDonald et al. | 370/338 |

(Continued)

FOREIGN PATENT DOCUMENTS

KR 100204587 B1 3/1999

OTHER PUBLICATIONS

Handley et al., RFC 2543, SIP: Session Initiation Protocol, Mar. 1999, all pages.*

(Continued)

*Primary Examiner* — Hieu Hoang
(74) *Attorney, Agent, or Firm* — L. Alan Collins; Collins & Collins Intellectual, LLC (57) ABSTRACT

Conferencing data is reliably delivered to computer systems participating in a hierarchically arranged multi-cast conferencing session. When a child computer system does not receive a multi-cast packet (e.g., an IP multi-cast packet), the child computer system sends a negative acknowledgment to a parent computer system. In response, the parent computer system re-transmits conferencing data that was contained in the multi-cast packet to the child computer system. Conferencing data can be re-transmitted to the child computer system via uni-cast (e.g., TCP). Accordingly, conferencing data that is not received or that is damaged via multi-cast can be repaired via uni-cast. Computer systems can join an existing multi-cast conference session without having to communicate with the root computer system. The root computer system adjusts a multi-cast send rate to compensate for changed network conditions.

12 Claims, 6 Drawing Sheets

U.S. PATENT DOCUMENTS

| | | | |
|---|---|---|---|
| 2003/0087653 A1 | 5/2003 | Leung | |
| 2003/0165136 A1* | 9/2003 | Cornelius et al. | 370/356 |
| 2004/0078624 A1 | 4/2004 | Maxemchuk | |
| 2004/0236829 A1 | 11/2004 | Xu | |
| 2006/0155839 A1 | 7/2006 | Hundscheidt et al. | |
| 2007/0192412 A1 | 8/2007 | Xu | |
| 2007/0198737 A1 | 8/2007 | Xu | |

OTHER PUBLICATIONS

Schwartz, "Telecommunication Network: Protocols, Modeling and Analysis", pp. 119-129, 1988.

Communication pursuant to Article 96(2) EPC, Ref. EP30733TE900kap, for Application No. 04 009 226.4-2416, Jul. 12, 2006.

Lin, John C., "RMTP: A Reliable Multicast Transport Protocol", Proceedings of INFOCOM, Mar. 1996.

Ott, "Multicasting the ITU MCS: Integrating Point-To-Point and Multicast Transport", Singapore ICCS, Nov. 14-18, 1994.

Communication pursuant to Article 96(2) EPC, Ref. EP30733TE900kap, for Application No. 04 009 226.4-2416, Nov. 7, 2007.

IUT-T Recommendation T.125, "Multipoint Communication Service Protocol Specification", Feb. 1998.

Lin Yu, "A Delay Analysis of RMTP", Journal of Software, 2002; see English Abstract on p. 26.

"A Self-Adaptive Load Balanced Internet Multicast Routing Protocol", Jhyde Lin and Ruay-Shiung Chang, vol. 10, No. 3, May-Jun. 1999, pp. 227-243.(The corresponding document was previously submitted in connection with parent U.S. Appl. No. 10/436,613 and is not being resubmitted herewith per 37 CFR 1.98(d).).

"End-to-End Reliable Multicast Transport Protocol Adaption for Floor Control and Other Conference Control Functions Requirements", Nadia Kauser, Jon Crowcroft, Department of Computer Science University College London, Gower Street, London WC1E 6BT, UK, pp. 66-78.(The corresponding document was previously submitted in connection with U.S. Appl. No. 10/436,613 and is not being resubmitted herewith per 37 CRF 1.98(d).), ACM, 1998.

Yamamoto, et al., "NAK Based Flow Control Scheme for Reliable Multicast", retrieved at <<http://ieeexplore.ieee.org/ ie.I5/6295/16831/00776460.pdf:>>, IEEE Paper 1998.(The corresponding document was previously submitted in connection with U.S. Appl. No. 10/436,613 and is not being resubmitted herewith per 37 CFR 1.98(d).).

Chiu, et al., "A Flow Control Algorithm for ACK-Based Reliable Multicast", retrieved at <<http://info.iet.unipi.it/~luigi/rmcc_sim.pdf:>>, May 1, 1999.(The corresponding document was previously submitted in connection with U.S. Appl. No. 10/436,613 and is not being resubmitted herewith per 37 CFR 1.98(d).).

Handley, et al., "SIP: Session Initiation Protocol, RFC 2543", retrieved at <<http://www.ietf.org/rfc/rfc2543.txt.>>, Mar. 1999.(The corresponding document was previously submitted in connection with U.S. Appl. No. 10/436,613 and is not being resubmitted herewith per 37 CFR 1.98(d).).

Kim, et al., Convergence Layer: MCS over RMP, retrieved at <<http://ieeexplore.ieee.org/iel4/5224/14216/00652222.pdf?amumber=652222>>.(The corresponding document was previously submitted in connection with U.S. Appl. No. 10/436,613 and is not being resubmitted herewith per 37 CFR 1.98(d).), IEEE, 1997.

Handley, et al., "RFC 2327 SDP: Session Description Protocol", retrieved at <<http://www.faqs.org/ftp/rfc/pdf/rfc2327.txt.pdf>>, Section 4.1, 5, 5.1.(The corresponding document was previously submitted in connection with U.S. Appl. No. 10/436,613 and is not being resubmitted herewith per 37 CFR 1.98(d).), 1998.

* cited by examiner

RELIABLE DELIVERY OF MULTI-CAST CONFERENCING DATA

CROSS-REFERENCE TO RELATED APPLICATION(S)

This application is a divisional and claims benefit to U.S. patent application Ser. No. 10/436,613 filed May 13, 2003.

BACKGROUND OF THE INVENTION

1. The Field of the Invention

The present invention relates to network communication technology, and more specifically, to reliable delivery of multi-cast conferencing data.

2. Background and Relevant Art

Computer networks have enhanced our ability to communicate and access information by allowing one computer or device (hereinafter both referred to as a "computing system") to communicate over a network with another computing system using electronic messages. When transferring an electronic message between computing systems, the electronic message will often pass through a protocol stack that performs operations on the data within the electronic message (e.g., packetizing, routing, flow control). The Open System Interconnect ("OSI") model is an example of a networking framework for implementing a protocol stack.

The OSI model breaks down the operations for transferring an electronic message into seven distinct "layers," each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to higher intermediate layers and then eventually received at the application layer. The application layer, the upper most layer, is responsible for supporting applications and end-user processes, such as, for example, electronic conferencing software.

Often, when two computing systems are to communicate with each other, the two computing systems will first establish a connection (e.g., a Transmission Control Protocol ("TCP") connection). Thus, when a number of different computing systems are to participate in an electronic conference, the different computing systems may establish connections among one another. Accordingly, each computing system participating in the electronic conference is then able to share conference data with every other computing system participating in the electronic conference. The established connections can result in the computing systems being configured in a logical hierarchy, such as, for example, that of a T.120 conferencing session. A logical hierarchy can include a root computing system having connections to one or more intermediate computing systems, that are in turn eventually connected to one or more leaf computing systems (potentially through connections to one or more other intermediate computing systems). Accordingly, a logically hierarchy can include a significant number of established connections.

During an electronic conference, conferencing data typically originates at an intermediate or leaf computing system in one branch of the logical hierarchy. The intermediate or leaf computing system transfers the conferencing data up the logical hierarchy (e.g., by utilizing established TCP connections) to the root computing system. The root computing system then transfers the conferencing data down the logical hierarchy (e.g., by utilizing established TCP connections) to all the intermediate and leaf computing systems in the logical hierarchy. Accordingly, for conferencing data to reach an intermediate or leaf computing system the conferencing data may travel over a number of established connections. For example to deliver conferencing data to a leaf computing system, the conferencing data may travel over first connection between a root computing system and a first intermediate computing system, over second connection between the first intermediate computing system and a second intermediate computing system, and over a third connection between the second intermediate computing system and the leaf computing system.

Many connection-oriented protocols, such as TCP, provide the features of end-to-end error recovery, resequencing, and flow control. Accordingly, utilizing a connection-oriented protocol to transfer conferencing data increases reliability. However, to realize the features of connection-oriented protocols, state information, such as, for example, send and receive buffers, congestion control parameters, and sequence and acknowledgment number parameters must be maintained for each TCP connection. Further, some state information must be transferred along with conferencing data when conferencing data is transferred between computing systems. Maintenance and transfer of state information consumes computing system resources (e.g., system memory), consumes network bandwidth, and potentially increases network latency. In an electronic conference with a number of intermediate and leaf computing systems the bandwidth consumed by transferred state information can be relatively large.

As a result, some electronic conferencing applications have utilized multi-cast protocols (e.g., multi-cast Internet Protocol ("IP")) to transfer conferencing data from a root computing system down to other computing systems in a logically hierarchy. In electronic conferences utilizing multi-cast protocols, each intermediate and leaf computing system listens on the same designated multi-cast address for conferencing data. Accordingly, a root computing system need only transmit conferencing data to the designated multi-cast address to deliver the conferencing data to all the other computing systems. During normal operation, each computing system listening on the designated multi-cast address will then receive the conferencing data.

However, since multi-cast protocols are typically not connection-oriented, multi-cast protocols do not provide any reliable messaging features (e.g., end-to-end error recovery, resequencing, flow control, etc). Thus, when multi-cast data is lost or damaged there is little, if anything, that can be done to recover the lost or damaged data. This is unfortunate, since lost or damaged conferencing data can significantly reduce the usefulness of an electronic conference. Further, since multi-cast conferencing data is transmitted to every computer system, lost or damaged multi-cast conferencing data can potentially affect every intermediate and leaf computing system participating in the electronic conference. Therefore systems, methods, computer program products, and data structures for reliably delivering multi-cast conferencing data would be advantageous.

BRIEF SUMMARY OF THE INVENTION

The foregoing problems with the prior state of the art are overcome by the principles of the present invention, which are directed towards methods, systems, and computer program products for reliable delivery of multi-cast conferencing data. A number of computer systems participate in a hierarchically arranged multi-cast conference session that includes at least a parent computer system and one or more corresponding child computer systems. The parent computer system (which may or may not be a root computer system) accesses a multi-cast packet (e.g., an Internet Protocol ("IP") multi-cast packet) containing conferencing data for the multi-cast conference session. The parent computer system stores the conferencing data in a receive buffer until receiving an acknowledgment from each of one or more corresponding child computer systems indicating reception of the conferencing data.

A child computer system detects, for example, by utilizing sequence numbers, that the child computer system did not receive the multi-cast packet. The child computer system sends a negative acknowledgement message to the parent computer system to indicate that the multi-cast packet was not received. In response, the parent computer system identifies a mechanism for re-transmitting the stored conferencing data to the child computer system. When the parent computer system is the root computer system, the parent computer system may identify a multi-cast or a uni-cast mechanism (e.g., utilizing a Transmission Control Protocol ("TCP") connection) for re-transmitting the conferencing data.

On the other hand, when the parent computer system is not the root computer system, the parent computer system can identify a uni-cast mechanism. Thus, conferencing data can be re-transmitted to a child computer system via uni-cast when it is indicated that a multi-cast packet is not received. Accordingly, embodiments of the present invention can more reliably deliver conferencing data through recovery via connection-oriented protocols, while still realizing potential bandwidth savings and reduced latency associated with multi-cast protocols. Further, embodiments of the present invention allow both multi-cast capable computer systems and computers that are not multi-cast enabled to participate in the same conferencing session. Multi-cast capable computer systems can participate in the conferencing session via multi-cast and computers that are not multi-cast enabled can participate in the conferencing session via uni-cast.

In some embodiments, a parent computer system invites a child computer system to join an existing multi-cast conference session. The parent computer system access a multi-cast address for the multi-cast conference session and transmits a multi-cast invite message, including at least the multi-cast address, to the child computer system. In response to the multi-cast invite, the child computer system sends a multi-cast status message indicating to the parent computer system the capability to receive multi-cast packets. In response to the multi-cast status message, the parent computer system sends a next multi-cast sequence number to the child computer system. The next multi-cast sequence number indicates the multi-cast sequence number that is to be associated with the next multi-cast packet received at the child computer system. Accordingly, the child computer system can dynamically join an existing multi-cast conference session without significantly impacting other computer systems already participating in the existing multi-cast conference session.

From time to time, a root computer system can adjust a current send rate for multi-cast packets. When the root computer system's immediate child computer systems acknowledge reception of a sequence of multi-cast packets within a specified period of time, a current send rate can be increased. On the other hand, when the immediate child computer systems do not acknowledge reception of a sequence of multi-cast packets within a specified period of time (e.g., as a result of network congestion or latency), the send rate of multi-cast packets can be decreased. Accordingly, a root computer system can adjust a send rate to compensate for changes in the transmission characteristics (e.g., available bandwidth and latency) of networks used to deliver multi-cast packets.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for reliably delivering multi-cast conferencing data to computer systems participating in a multi-cast conference session. When multi-cast conferencing data is lost or damaged during delivery, the lost or damaged conferencing data can be repaired via connection-oriented uni-cast delivery. Computer systems can join an existing multi-cast conference session without significantly impacting other computer systems already participating in the existing multi-cast conference session. A root computer system can adjust a multi-cast send rate to compensate for changed network conditions.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more logical communication links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that enables the transport of electronic data between two entities such as computer systems or modules. The actual physical representation of a communication path between two entities is not important and may change over time, such as, for example, when a routing path is changed. A logical communication link can include portions of a system bus, a local area network, a wide area network, the Internet, combinations thereof, or portions of any other path that facilitates the transport of electronic data. Logical communication links are defined to include hardwired links, wireless links, or a combination of hardwired links and wireless links. Logical communication links can also include software or hardware modules that condition or format portions of data so as to make the portions of data accessible to components that implement the principles of the present invention (e.g., proxies, routers, gateways, etc).

In this description and in the following claims, "conferencing data" is defined as data associated with an electronic conference. Conferencing data can be transferred between computer systems participating in the electronic conference. Conferencing data is defined to include audio and/or video streams, visual and/or non-visual data, and/or data files that are delivered from a sending computer system (e.g., a root computer system) to a receiving computer system (e.g., an intermediate or leaf computer system). For example, conferencing data can include voice over Internet Protocol ("IP") data (audio stream data), camera video data (video stream data), application sharing and whiteboard data (visual data), chat text data (non-visual data), and/or file transfer data (data file). Conferencing data can be transferred using a wide variety of protocols or combination of protocols, such as, for example, Internet Protocol ("IP"), User Datagram Protocol ("UDP"), Transmission Control Protocol ("TCP"), Real-Time Transport Protocol ("RTP"), and Real Time Streaming Protocol ("RTSP").

In this description and in the following claims, "send rate" is defined as the speed with which conferencing data is transferred (or is to be transferred) onto a logical communication link, across a logical communication link, or received from a logical communication link. A send rate can be measured in a variety of different units, such as, for example, Megabits per second ("Mbps") and Megabytes per second ("MBps").

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Figure 1:
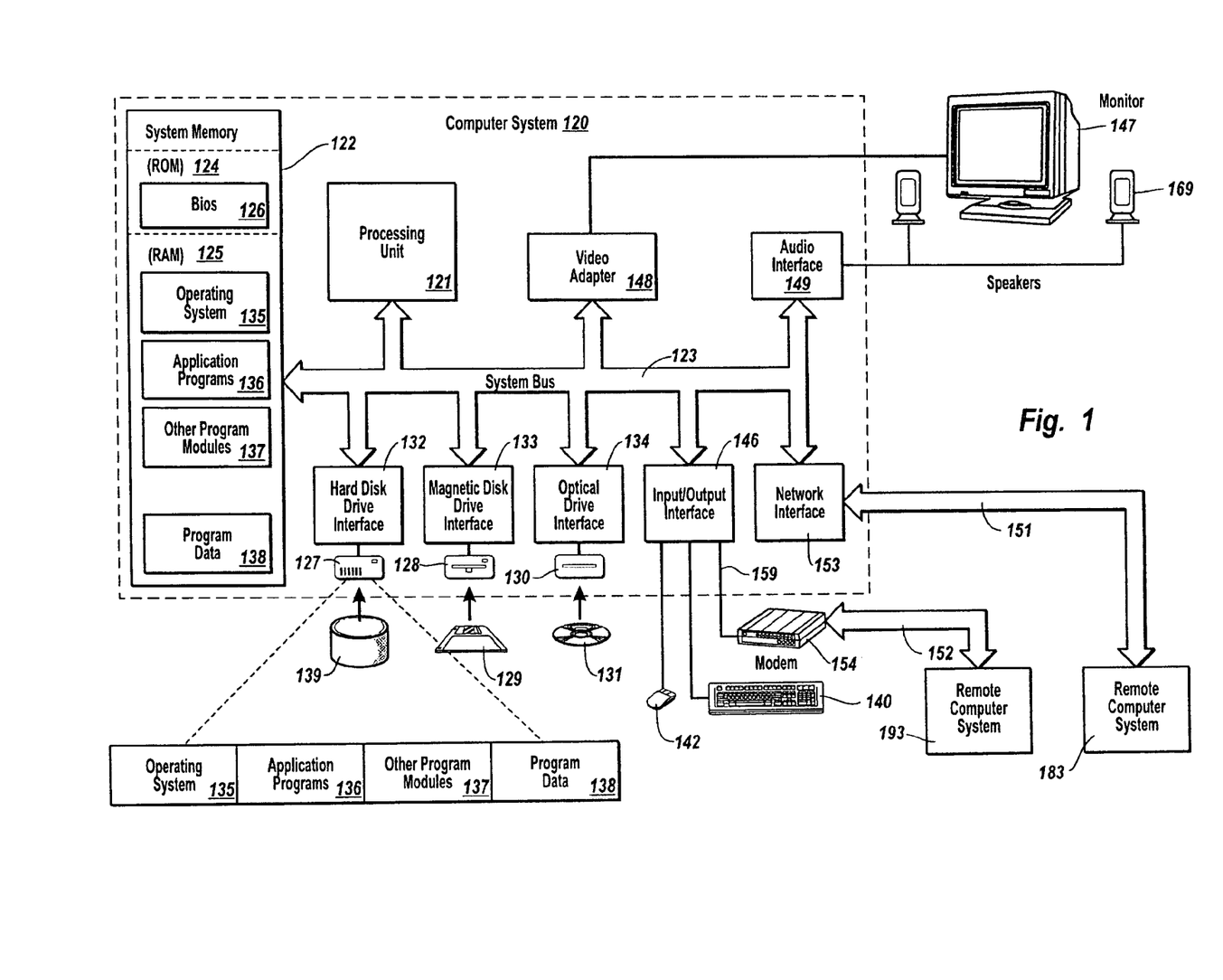
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, an example system for implementing the invention includes a general-purpose computing device in the form of computer system 120, including a processing unit 121, a system memory 122, and a system bus 123 that couples various system components including the system memory 122 to the processing unit 121. Processing unit 121 can execute computer-executable instructions designed to implement features of computer system 120, including features of the present invention. The system bus 123 may be any of several types of bus structures including a memory bus or memory controller, a peripheral bus, and a local bus using any of a variety of bus architectures. The system memory includes read only memory ("ROM") 124 and random access memory ("RAM") 125. A basic input/output system ("BIOS") 126, containing the basic routines that help transfer information between elements within computer system 120, such as during start-up, may be stored in ROM 124.

The computer system 120 may also include magnetic hard disk drive 127 for reading from and writing to magnetic hard disk 139, magnetic disk drive 128 for reading from or writing to removable magnetic disk 129, and optical disk drive 130 for reading from or writing to removable optical disk 131, such as, or example, a CD-ROM or other optical media. The magnetic hard disk drive 127, magnetic disk drive 128, and optical disk drive 130 are connected to the system bus 123 by hard disk drive interface 132, magnetic disk drive-interface 133, and optical drive interface 134, respectively. The drives and their associated computer-readable media provide non-volatile storage of computer-executable instructions, data structures, program modules, and other data for the computer system 120. Although the example environment described herein employs magnetic hard disk 139, removable magnetic disk 129 and removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 139, magnetic disk 129, optical disk 131, ROM 124 or RAM 125, including an operating system 135, one or more application programs 136, other program modules 137, and program data 138. A user may enter commands and information into computer system 120 through keyboard 140, pointing device 142, or other input devices (not shown), such as, for example, a microphone, joy stick, game pad, scanner, or the like. These and other input devices can be connected to the processing unit 121 through input/output interface 146 coupled to system bus 123. Input/output interface 146 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or can even logically represent a combination of different interfaces.

A monitor 147 or other display device is also connected to system bus 123 via video interface 148. Speakers 169 or other audio output device is also connected to system bus 123 via audio interface 149. Other peripheral output devices (not shown), such as, for example, printers, can also be connected to computer system 120.

Computer system 120 is connectable to networks, such as, for example, an office-wide or enterprise-wide computer network, a home network, an intranet, and/or the Internet. Computer system 120 can exchange data with external sources, such as, for example, remote computer systems, remote applications, and/or remote databases over such networks.

Computer system 120 includes network interface 153, through which computer system 120 receives data from external sources and/or transmits data to external sources. As depicted in FIG. 1, network interface 153 facilitates the exchange of data with remote computer system 183 via logical communication link 151. Network interface 153 can logically represent one or more software and/or hardware modules, such as, for example, a network interface card and corresponding Network Driver Interface Specification ("NDIS") stack. Logical communication link 151 represents a portion of a network (e.g., an Ethernet segment), and remote computer system 183 represents a node of the network. For example, remote computer system 183 can be computer system that transmits conferencing to computer system 120. On the other hand, remote computer system 183 can be a receiving computer system that receives conferencing from computer system 120.

Likewise, computer system 120 includes input/output interface 146, through which computer system 120 receives data from external sources and/or transmits data to external sources. Input/output interface 146 is coupled to modem 154 (e.g., a standard modem, a cable modem, or digital subscriber line ("DSL") modem) via logical communication link 159, through which computer system 120 receives data from and/or transmits data to external sources. As depicted in FIG. 1, input/output interface 146 and modem 154 facilitate the exchange of data with remote computer system 193 via logical communication link 152. Logical communication link 152 represents a portion of a network and remote computer system 193 represents a node of the network. For example, remote computer system 193 can be a computer system that transmits conferencing data to computer system 120. On the other hand, remote computer system 193 can be computer system that receives conferencing data from computer system 120.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
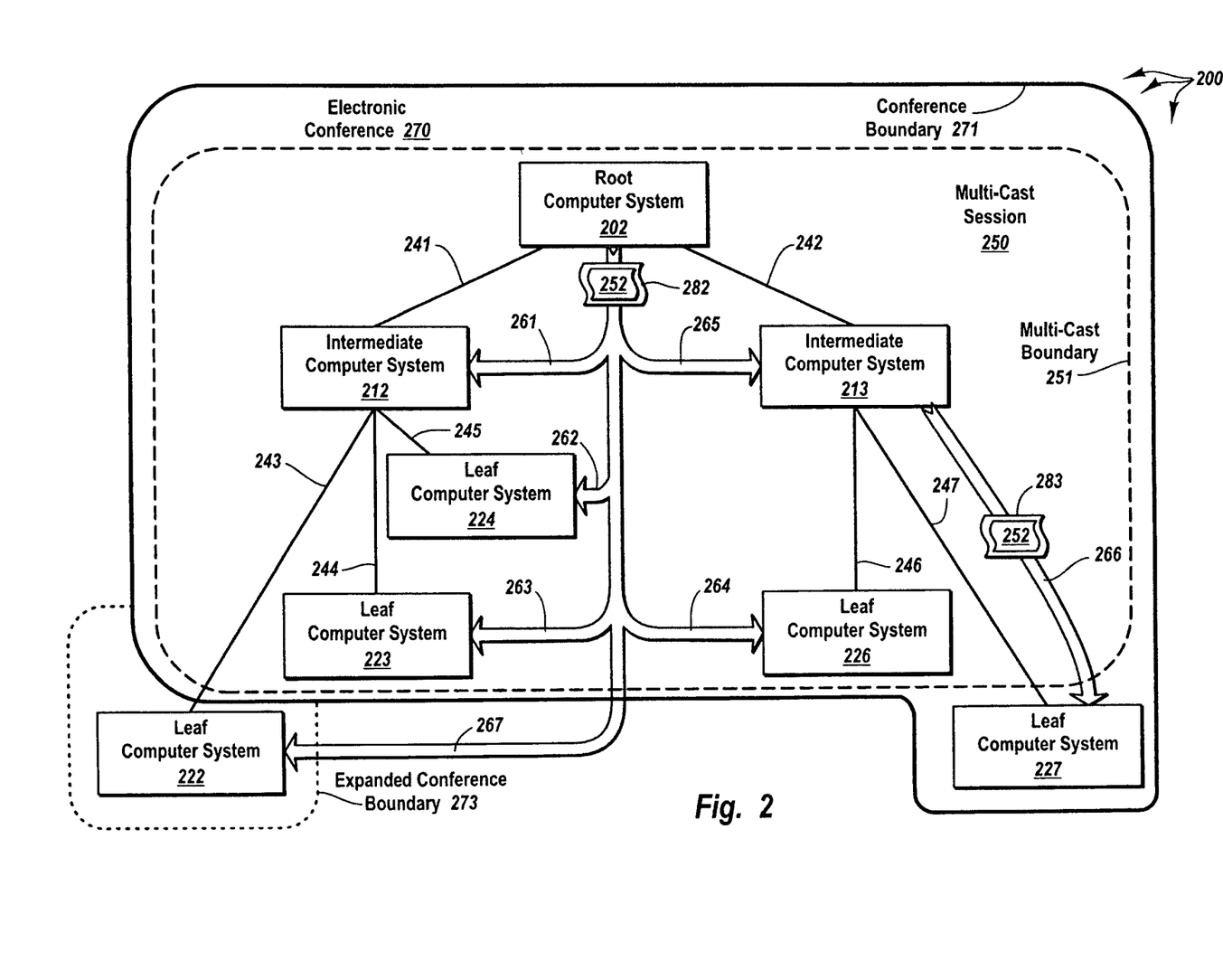
FIG. 2 illustrates an example of a network architecture that facilitates delivery of multi-cast conferencing data with increased reliability.

FIG. 2 illustrates example network architecture 200. The computer systems in network architecture 200 are connected to one another by logical communication links 241-247 (hereinafter referred to simply as "links"), resulting in the depicted hierarchical configuration, such as, for example, that of a T.120 electronic conference. Accordingly, some computer systems are viewed as parent computer systems of other computer systems. For example, root computer system 202 can be viewed as a parent computer system of intermediate computer systems 212 and 213. On the other hand, some computer systems are viewed as child computer systems of other computers systems. For example, leaf computer systems 222, 223, and 224 can be viewed as child computer systems of intermediate computer system 212. Similarly, leaf computer systems 226 and 227 can be viewed as child computer systems of intermediate computer system 213.

Some computer systems are viewed as both child computer systems and parent computer systems. For example, intermediate computer system 212 can be viewed as a child of root computer system 202 and a parent computer system of leaf computer systems 222, 223, and 224. Similarly, intermediate computer system 213 can be viewed as a child of root computer system 202 and a parent computer system of leaf computer systems 226 and 227.

The computer systems depicted within conference boundary 271 (the solid line) are participating in electronic conference 270. Of the participating computer systems, those depicted within multi-cast boundary 251 (the dashed line) are participating in multi-cast session 250 and can receive conferencing data (for electronic conference 270) that has been multi-cast (e.g., IP multi-cast). Root computer system 202 can allocate a designated multi-cast address (e.g., an IP multi-cast address) as a destination network address for multi-cast packets containing conferencing data. When a computer system joins multi-cast session 250, the joining computer system is made of aware of the designated multi-cast address. Accordingly, the joining computer system can listen on the designated multi-cast address for multi-cast packets containing conferencing data. For example, intermediate computer systems 212 and 213 and leaf computer systems 223, 224, and 226 can listen on a designated multi-cast address for multi-cast packets from root computer system 202. As depicted by arrows 261-265, multi-cast packet 282, which contains conferencing data 252, is multi-cast to intermediate computer systems 212 and 213 and leaf computer systems 223, 224, and 226.

Other participating computer systems, such as, for example, computer systems that do not support multi-cast, can participate in electronic conference 270 via uni-cast. For example, intermediate computer system 213 and leaf computer system 227 may communicate via a TCP connection. Accordingly, after receiving multi-cast packet 282, intermediate computer system 213 can extract conferencing data 252. Intermediate computer system 213 can then include conferencing data 252 in TCP packet 283 for delivery to leaf computer system 227. As depicted by arrow 266, intermediate computer system 213 can delivery TCP packet 266 to leaf computer system 227.

Figure 3:
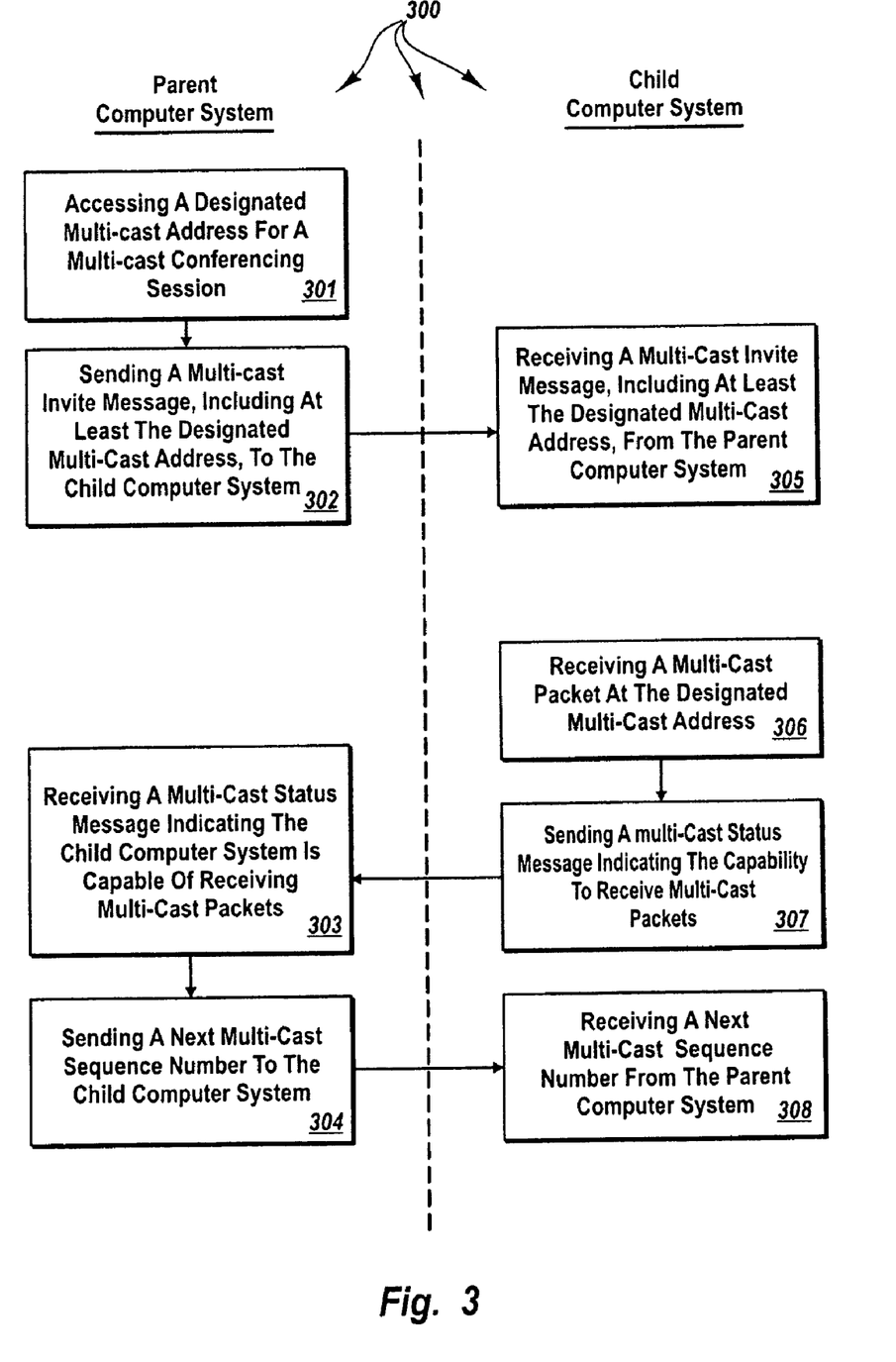
FIG. 3 illustrates an example flowchart of a method for joining an existing multi-cast conference session.

FIG. 3 illustrates an example flow chart of a method 300 for joining an existing multi-cast session. The method 300 will be described with respect to the computer systems in network architecture 200.

The method 300 includes an act of accessing a designated multi-cast address for a multi-cast session (act 301). Act 301 can include an intermediate computer system, such as, for example, intermediate computer system 212, identifying an IP multi-cast address currently being used by the intermediate computer system. Alternatively, a root computer system, such as, for example, root computer system 202, can allocate an IP multi-cast network address. An allocated IP multi-cast address may be an IP address from a reserved range of IP address, such as, for example, between 224.0.0.0 and 239.255.255.255. An IP multi-cast address can be allocated using an allocation protocol, such as, for example, Multicast Dynamic Client Allocation Protocol ("MDHCP").

An IP multi-cast address can be allocated sequentially or randomly from a range of IP multi-cast addresses supplied by an administrator. Before allocating an IP multi-cast address, a root computer system can perform a check to determine if the IP multi-cast address is already in use (e.g., by an existing multi-cast session). To reduce the negative impacts associated with a plurality of computer systems allocating the same IP multi-cast address, an IP multi-cast address and a root computer system's IP address can be combined to form a unique identifier for a multi-cast session. When a multi-cast packet is received, a receiving computer system checks both the IP multi-cast address and root computer system's IP address. When the check determines that the multi-cast packet is for a multi-cast session the receiving computer system is not participating in, the multi-cast packet can be discarded.

The method 300 includes an act of sending a multi-cast invite message, including at least the designated multi-cast address, to the child computer system (act 302). Act 302 can include a parent computer system, such as, for example, intermediate computer system 212, sending a multi-point communication service ("MCS") Connect-Initial message to a child computer system, such as, for example, leaf computer system 222. A multi-cast invite message can include a session identifier data structure representing the designated multi-cast address, a designated multi-cast port, and a network address of the multi-cast sender, such as, for example, an IP address of root computer system 202. One of the fields of the session identifier data structure can represent a designated multi-cast address for a multi-cast session. Another field of the session identifier data structure can represent a designated port for the multi-cast session. Yet another field of the data structure can represent a network address of the multi-cast sender.

The method 300 includes an act of receiving a multi-cast invite message, including at least the designated multi-cast address, from the parent computer system (act 305). For example, leaf computer system 222 can receive the multi-cast invite message sent from intermediate computer system 212. A received multi-cast invite message can include a session identifier, for example, represented in a session identifier data structure. When a child computer system receives a session identifier data structure, the child computer system can maintain the fields of the session identifier data structure in memory. Accordingly, a child computer system can use a session identifier data structure to facilitate configuration of a network interface and for verifying that multi-cast packets are associated with a particular multi-cast session.

The method 300 includes an act of receiving a multi-cast packet at the designated multi-cast address (act 306). Act 306 can include receiving a multi-cast packet transmitted from the root computer system for reception by computer systems participating in a multi-cast session. For example, as indicated by arrow 267, leaf computer system 222 can receive multi-cast packet 282. Reception of multi-cast packet 282 indicates to leaf computer system 222 that a received multi-cast invite message contained appropriate connection information (e.g., designated multi-cast address, designated multi-cast port, and network address of root computer system 202) for joining multi-cast session 250.

The method 300 includes an act of sending a multi-cast status message indicating the capability to receive multi-cast packets (act 307). Act 307 can include a child computer system sending a multi-cast status message to a parent computer system in response to receiving a multi-cast packet. For example, in response to receiving multi-cast packet 282, leaf computer system 222 can send a multi-cast status message to intermediate computer system 212. The multi-cast status message can be an acknowledgment message acknowledging that leaf computer system 222 received multi-cast packet 282.

The method 300 includes an act of receiving a multi-cast status message indicating that the child computer system is capable of receiving multi-cast packets (act 303). Act 303 can include a parent computer system receiving a multi-cast status message indicating that the child computer system can receive multi-cast packets for the multi-cast session. For example, intermediate computer system 212 can receive a multi-cast status message from leaf computer system 222. A received multi-cast status message can be an acknowledgment message acknowledging that leaf computer system 222 received multi-cast packet 282. Since intermediate computer system 212 also receives multi-cast packet 282, intermediate computer system 212 can verify that a received multi-cast status message is appropriate (e.g., that the multi-cast packet was received at the designated multi-cast address and port, etc.).

The method 300 includes an act of sending a next multi-cast sequence number to the child computer system (act 304). Act 304 can include a parent computer system sending a next multi-cast sequence number to child computer system in response to receiving a multi-cast status message. For example, intermediate computer system 212 can send a multi-cast invite-confirm message including the next multi-cast sequence number to leaf computer system 222 in response to leaf computer system 222 acknowledging receipt of multi-cast packet 282. The next multi-cast sequence number can indicate the sequence number that is to be associated with the next multi-cast packet for multi-cast session 250.

The method 300 includes an act of receiving a next multi-cast sequence number from the parent computer system (act 308). Act 308 can include a child computer system receiving a next multi-cast sequence number from a parent computer system. For example, leaf computer system 222 can receive a multi-cast invite-confirm message including the next multi-cast sequence number from intermediate computer system 212. The next-multi-cast sequence number indicates to leaf computer system 222 the sequence number that is to be associated with the next multi-cast packet for multi-cast session 250. Accordingly, leaf computer system 222 can begin to indicate to intermediate computer system 212 when multi-cast packets are not received.

When leaf computer system 222 joins multi-cast session 250, both multi-cast session boundary 251 and a conference boundary 271 can be expanded to include leaf computer system 222. This expansion is collectively represented by expanded conference boundary 273 (the dotted line). Leaf computer system 222 joins both multi-cast session 250 and electronic conference 270 without ever sending data to root computer system 202. Further, little, if any, resources are expended at root computer system 202 as a result of leaf computer system joining. Accordingly, leaf computer system 222 joins multi-cast session 250 (an existing multi-cast session) without significantly impacting other computer systems already participating in multi-cast session 250.

Figure 4:
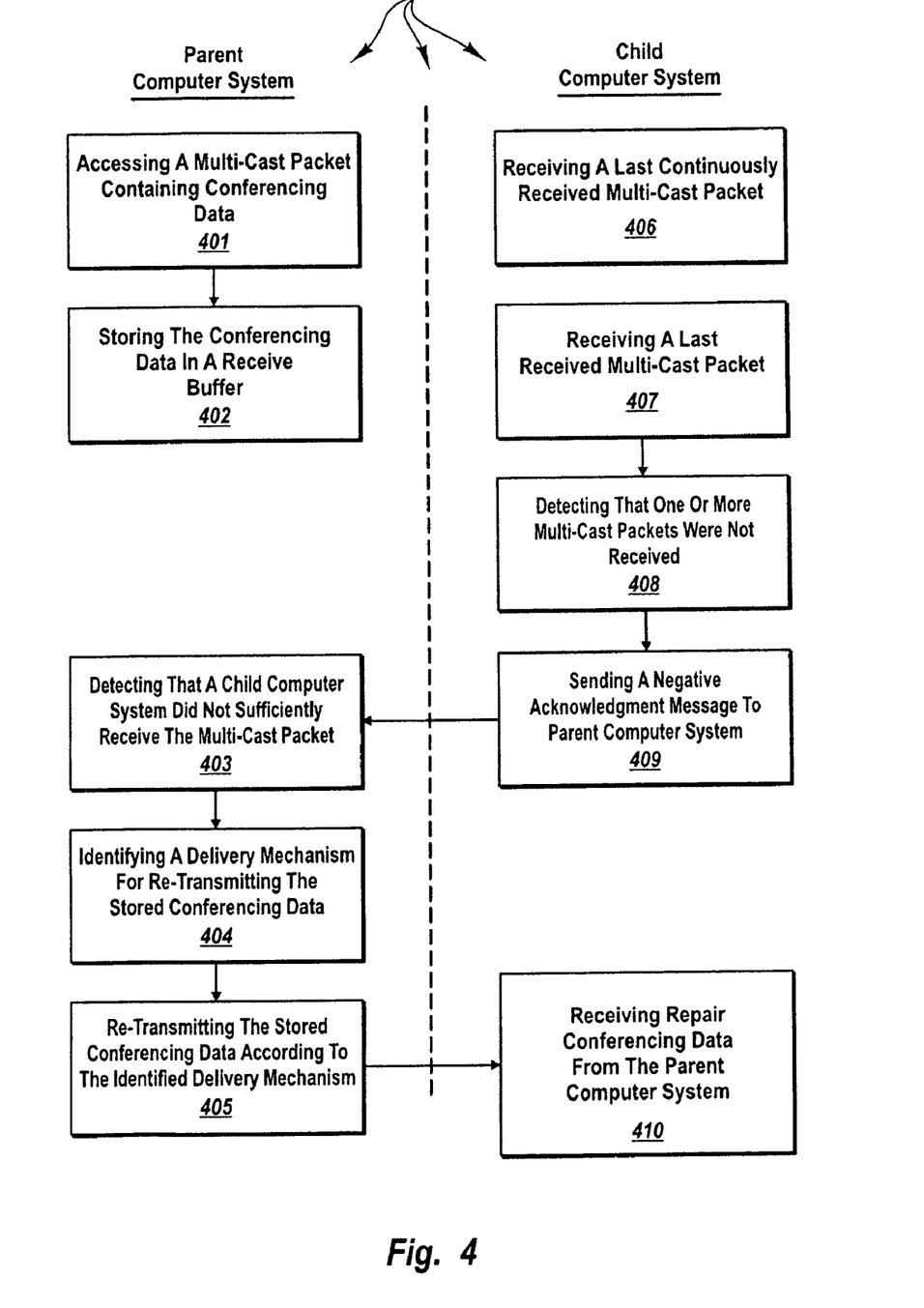
FIG. 4 illustrates an example flowchart of a method for more reliably delivering multi-cast conferencing data.

FIG. 4 illustrates an example flow chart of a method 400 for more reliable delivery of multi-cast conferencing data. The method 400 will be described with respect to the computer systems in network architecture 200.

The method 400 includes an act of accessing a multi-cast packet containing conferencing data (act 401). Act 401 can include accessing a multi-cast packet that includes conferencing data for a multi-cast session. The multi-cast packet can be a multi-cast packet that was originally multi-cast by a root computer system for delivery to other computer systems participating in the multi-cast session. A multi-cast packet can be accessed by a root computer system, an intermediate computer system, or a leaf computer system participating in the multi-cast session. For example, within multi-cast session 250, root computer system 202, intermediate computer system 212, or intermediate computer system 213 can access multi-cast packet 282.

Accessing a multi-cast packet can include accessing conferencing data contained in the multi-cast packet. For example, root computer system 202 may access conferencing data 252 before transmitting multi-cast packet 282 to computer systems participating in multi-cast session 250. Intermediate computer system 212 and intermediate computer system 213 can access conferencing data 252 after they receive multi-cast packet 282.

The method 400 includes an act of storing conferencing data in a receive buffer (act 402). Act 402 can include a root computer system or intermediate computer system storing accessed conferencing data in a receive buffer. For example within multi-cast session 250, root computer system 202, intermediate computer system 212 and/or intermediate computer system 213, can store conferencing data 252 in a receive buffer. It may be that parent computer system simultaneously stores conferencing data from a plurality of multi-cast packets.

Conferencing data can remain stored in a receive buffer (e.g., in system memory) until all of a computer system's corresponding multi-cast session child computer systems acknowledge receipt of the conferencing data. For example, intermediate computer system 213 can store conferencing data 252 until leaf computer system 226 acknowledges receipt of conferencing data 252. Since leaf computer system 227 is participating in electronic conference 270 via uni-cast, leaf computer system 227 will not acknowledge receipt of conferencing data 252. Conferencing data can be flushed (removed) from a receive buffer after receiving appropriate acknowledgments from corresponding child computer systems. For example, after receiving acknowledgments from leaf computer system 226 and leaf computer 227, intermediate computer system 213 can flush conferencing data 252 from a corresponding receive buffer.

The method 400 includes an act of receiving a last continuously received multi-cast packet (Act 406). Act 406 can include an intermediate or leaf computer system receiving a last continuously received multi-cast packet. For example, any of the computer systems participating in multi-cast session 250 can receive a last continuously received multi-cast packet transmitted from root computer system 202.

An ACK window parameter value can be maintained at a parent computer system to schedule the transmission acknowledgment messages from child computer systems. An ACK window parameter value indicates to child computer systems the number of multi-cast packets that are to be received between acknowledgment messages. An ACK window parameter value can change dynamically as child computer systems connect to and disconnect from the parent computer system. An ACK window parameter value can be configured such that the likelihood of an acknowledgment implosion at the parent computer system is reduced.

For example, for a parent computer system having "m" children computer systems, an ACK window parameter value "N" can be configured according to the equation (N/2) $<=m<=N$. Thus, for a parent computer system having 5 child computer systems, an ACK window parameter value of 5, 6, 7, 8, 9, or 10 may be selected. If 7 were selected, this would indicate to a child computer system that the child computer system is to send an acknowledgement message to the parent computer system after the reception of every 7 multi-cast packets. Child computer systems can randomly select a first multi-cast packet for acknowledgment to further reduce the likelihood of an acknowledgment implosion at the parent computer system.

As multi-cast packets are transmitted to computer systems participating in a multi-cast session, each multi-cast packet is assigned a sequence number. Different multi-cast packets can be assigned different sequence numbers so that the different multi-cast packets can be distinguished from one another. For example, sequence numbers can be assigned incremental (e.g., by adding one) so that a subsequent multi-cast packet can be distinguished from prior multi-cast packet. Upon reaching a maximum sequence number, assigned sequence numbers may "roll-over" and begin at zero. Sequence numbers can be used to indicate a packet ordering to a receiving computer system. Table 1 contains an example sequence of multi-cast packets for an ACK window parameter value of 5.

TABLE 1

| Order of Receipt | Packet | Sequence Number |
| --- | --- | --- |
| 1 | Multi-cast Packet A | 4 |
| 2 | Multi-cast Packet B | 6 |
| 3 | Multi-cast Packet C | 5 |
| 4 | Multi-cast Packet D | 8 |
| 5 | Multi-cast Packet E | 7 |

Although received in an order that differs from corresponding sequence numbers, a receiving computer system can use the sequence numbers to appropriately re-order the multi-cast packets after reception. For example, a receiving computer system could re-order the sequence of multi-cast packets in the following order: Multi-cast Packet A, Multi-cast Packet C, Multi-cast Packet B, Multi-cast Packet E, Multi-cast Packet D. Accordingly, Multi-cast Packet D can be viewed as a last continuously received multi-cast packet.

When no conferencing data is multi-cast for a specified time threshold, a root computer system can multi-cast a keep alive message having an appropriate sequence number (e.g., incremented form the last sequence number). Computer systems participating in a multi-cast session can acknowledge receipt of a keep alive message by sending an acknowledgment message to a corresponding parent computer system. Acknowledgment of a keep alive message indicates to a parent computer system that a corresponding child computer system is still capable of receiving multi-cast packets for the multi-cast session. For example, leaf computer system 226 can send an acknowledge message to intermediate computer system 213 to indicate continued capability to received multi-cast packets for multi-cast session 250.

When a parent computer system receives acknowledgment messages from all corresponding child computer systems, the parent computer system can in turn acknowledge receipt of the keep alive message to its parent computer system. Acknowledgments can continue up a hierarchical tree to a root computer system. For example, upon receiving acknowledgement messages from each of leaf computer systems 222, 223, and 224, intermediate computer system 212 can in turn send an acknowledgment message to root computer system 202. Keep alive messages can be sent out at specified keep-alive intervals. Keep alive intervals can be defined using exponential increases, such as, for example, 2 sec., 4 sec., 8 sec., 16 sec., etc. After a busy time, a keep alive interval can be decreased. On the other hand, after longer periods of idle time a keep alive interval can be increased.

The method 400 includes an act of receiving a last received multi-cast packet (act 407). Act 407 can include an intermediate or leaf computer system receiving a last received multi-cast packet. For example, any of the computer systems participating in multi-cast session 250 can receive a last received multi-cast packet multi-cast from root computer system 202. Table 2 contains a second example sequence of multi-cast packets for an ACK window parameter value of 6.

TABLE 2

| Order of Receipt | Packet | Sequence Number |
|---|---|---|
| 1 | Multi-cast Packet F | 15 |
| 2 | Multi-cast Packet G | 16 |
| 3 | Multi-cast Packet H | 17 |
| 4 | Multi-cast Packet I | 18 |
| 5 | Multi-cast Packet J | 21 |
| 6 | Multi-cast Packet K | 23 |

Table 2 indicates that a last received packet was Multi-cast Packet K.

The method 400 includes an act of detecting that one or more multi-cast packets were not received (act 408). Act 408 can include detecting that one or more multi-cast packets with sequences between the last continuously received multi-cast packet and the last received multi-cast packet were not received. For example, referring back to Table 2, Multi-cast Packet I can be viewed as a last continuously received multi-cast packet and Multi-cast Packet K can be viewed as a last received multicast packet. Accordingly, a computer system participating in a multi-cast session may detect that multi-cast packets corresponding to multi-cast sequence numbers 19, 20, and 22 were not received.

The method 400 includes an act of sending a negative acknowledgment message to a parent computer system (act 409). Act 409 can include a child computer system sending a negative acknowledgment message that indicates the child computer system did not receive one or more multi-cast packets having multi-cast sequence numbers between the last continuously received multi-cast packet and the last received multi-cast packet. For example, when appropriate, leaf computer system 222 can send a negative acknowledgment message to intermediate computer system 212 indicating that leaf computer system 222 did not receive one or more multi-cast packets for multi-cast session 250. Similarly, when appropriate, intermediate computer system 212 can send a negative acknowledgment message to root computer system 202 indicating that intermediate computer system 212 did not receive one or more multi-cast packets for multi-cast session 250.

A sent negative acknowledgment message can include a data structure representing the packet sequence number of the last continuously received multi-cast packet, the packet sequence number of the last received multi-cast packet, and a bit map indicating received and missing multi-cast packets between the last continuously multi-cast packet and the last received multi-cast packet. For example, a participating computer system that received the sequence of multi-cast packets in Table 2, could send a negative acknowledgement message with values of 18, 23, and a bit map indicating that 19, 20, 21, and 22 are sequence numbers of packets between 18 and 23 and that 19, 20, and 22 are marked as missing packets. Accordingly, a child computer system provides repair information that can be used by a corresponding parent computer system to replace conferencing data that was not received and/or repair damaged conferencing data.

The method 400 includes an act of detecting that a child computer system did not sufficiently receive a multi-cast packet (act 403). Act 403 can include a parent computer system receiving a negative acknowledgment message from a child computer system. For example, intermediate computer systems 212 may receive a negative acknowledgment message from leaf computer system 222, leaf computer system 223, or leaf computer system 224. Similarly, root computer system 202 may receive a negative acknowledgment message from intermediate computer system 212 or intermediate computer system 213.

A received negative acknowledgment message can include repair information identifying conferencing data that was not received by a child computer system and/or potentially identifying damaged conferencing data. Repair information can be represented in a repair information data structure. One of the fields of the repair information data structure can represent the last continuously received multi-cast packet that was received by a child computer system. Another field of the repair information data structure can the last received multi-cast packet that was received by the child computer system. Yet another field of the repair information data structure can represent a bit map of any multi-cast packets received between the last continuously multi-cast packet and the last received multi-cast packet received by the child computer system.

Accordingly, a parent computer system can use repair information to identify that conferencing data was not sufficiently received at the child computer system. A parent computer system can identify that conferencing data was not sufficiently received when a multi-cast packet is not received at all by the child computer system (i.e., the packet was lost). Alternatively, the parent computer system can identify that conferencing data was not sufficiently received when the parent computer system determines that conferencing data received at the child computer system was damaged.

Packet loss can be detected from received repair information. Referring back to Table 2, a parent computer system could identify from a received bit map that a child computer system did not receive multi-cast packets having sequence numbers 19, 20, and 22.

In some embodiments, a parent computer system detects that a child computer system did not receive a one or more multi-cast packets when an acknowledgment message is not received after a number of packets indicated by an ACK window parameter value. For example, when an ACK window parameter value is 7, a parent computer system should receive an acknowledgment message from a child computer system after every 7 multi-cast packets. If after reception of a $7^{th}$ multi-cast packet, the parent computer system does not receive an acknowledgement message the parent computer system may determine that the child computer system has not received one or more multi-cast packets.

A parent computer system may wait a specified time threshold for an acknowledgment message. As depicted by arrows 261 and 262 multi-cast packet 282 is delivered to intermediate computer system 212 and leaf computer system 224 respectively. When multi-cast packet 282 is the last packet in an ACK window, packet 282 can trigger an acknowledgment message from leaf computer system 224. Upon receiving multi-cast packet 282, intermediate computer system 212 will wait the specified time threshold to receive an acknowledgment message from leaf computer system 224. If an acknowledgment message is not received within the specified time threshold, intermediate computer system 212 may determine that leaf computer system 224 has not received one or more multi-cast packets.

A specified time threshold can be a round-trip time ("RTT") defined as the allowable time difference in accepting a multi-cast packet between a parent computer system and a child computer system. When a root computer system sends a multi-cast packet it records its local sending time. Subsequently, when a child computer system receives the multi-cast packet it records its local time. Then, when the child computer system is ready to send an acknowledgment message, it records a local delay time (e.g., for packet processing) inside the acknowledgement message. When the parent computer system receives the acknowledgment message it records the current time and the time elapsed since the parent computer system sent the multi-cast packet. By subtracting the delay time at the child computer system, the parent calculates the RTT to the child computer system. If the parent computer system is the root computer system it will calculate the real RTT to the child computer system.

The method 400 includes an act of identifying a delivery mechanism for re-transmitting the stored conferencing data (act 404). Act 404 can include a parent computer system identifying a delivery mechanism for re-transmitting stored conferencing data to a child computer system. For example, it may be that intermediate computer system 212 identifies a delivery mechanism for re-transmitting conferencing data 252 to leaf computer system 222. Similarly, it may be that that root computer system 202 identifies a delivery mechanism for re-transmitting conferencing data 252 to intermediate computer system 212.

A delivery mechanism can be identified based at least on the parent computer system's position in a hierarchically arranged conferencing session. An intermediate parent computer system can identify a uni-cast mechanism, such as, for example, TCP, as a mechanism for re-transmitting stored conferencing data. For example, intermediate computer system 212 can identify uni-cast as a mechanism for re-transmitting lost or damaged conferencing data to leaf computer system 222. However, a root computer system (e.g., root computer system 202) may identify either a uni-cast mechanism or a multi-cast mechanism for re-transmitting stored conferencing data.

When a threshold number of the root computer system's immediate child computer systems have lost conferencing data, the root computer system can determine that multi-cast is an appropriate mechanism for re-transmitting the conferencing data. An increased number of the immediate child computer systems needing repair can be indicative of an increased number of other computer systems lower in the hierarchy also needing repair. That is, when some intermediate computer systems (e.g., intermediate computer systems 212 and 213) have not received multi-cast data, there is an increased likelihood that other child computer systems (e.g., leaf computer systems 222, 223, 224, and 226) have also not received the multi-cast data. Accordingly, re-transmitting the conferencing data via multi-cast may be more efficient. For example, root computer system 202 can identify multi-cast as a mechanism for re-transmitting lost or damaged conferencing data to computer systems participating in multi-cast session 250.

On the other hand, when less than the threshold number immediate child computer systems have lost conferencing data, the root computer system can determine that uni-cast is an appropriate mechanism for re-transmitting the conferencing data. A decreased number of the immediate child computer systems needing repair can be indicative of a reduced number of other computer systems lower in the hierarchy also needing repair. That is, when a reduced number of intermediate computer systems (e.g., only intermediate computer systems 213) have not received multi-cast data, it is likely that a reduced number of other child computer systems (e.g., only leaf computer system 226) have also not received the multi-cast data. Accordingly, re-transmitting the conferencing data via uni-cast may be more efficient. For example, root computer system 202 can identify uni-cast as a mechanism for re-transmitting lost or damaged conferencing data to intermediate computer system 213.

The method 400 includes an act of re-transmitting the stored conferencing data according to the identified delivery mechanism (act 405). Act 405 can include a parent computer system re-transmitting conferencing data from a receive buffer to the child computer system (e.g., via uni-cast or multi-cast). For example, intermediate computer system 212 can re-transmit conferencing data (from a corresponding receive buffer) to leaf computer system 222 via TCP. Alternately, root computer system 202 can re-transmit conferencing data (from a corresponding receive buffer) to multi-cast session 250 via IP multi-cast.

Figure 6:
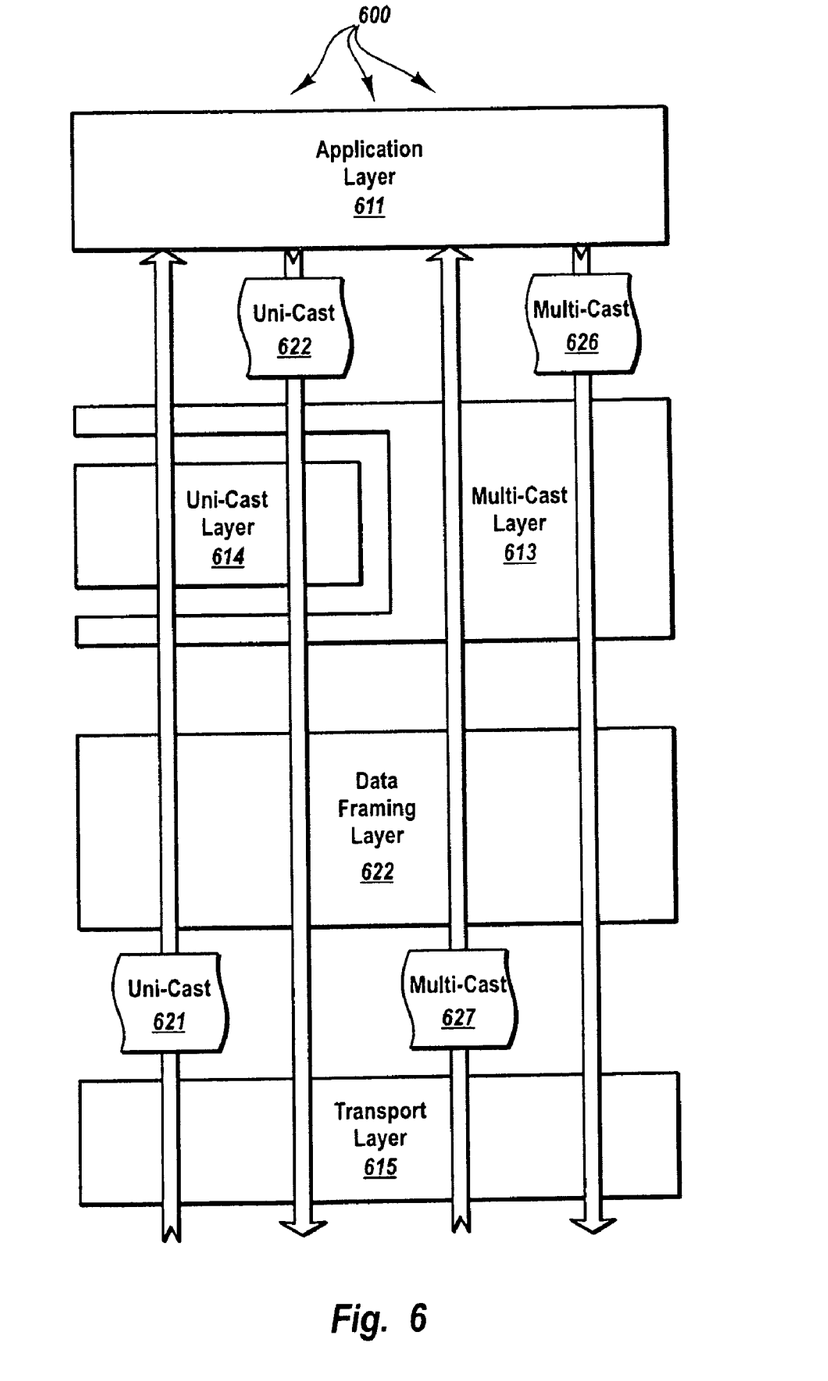
FIG. 6 illustrates an example protocol stack that facilitates appropriate synchronization of uni-cast and multi-cast sequencing numbers.

A protocol stack at a parent computer system can assign uni-cast sequence numbers such that the uni-cast sequence numbers synchronize with multi-cast sequence numbers of multi-cast packets. FIG. 6 illustrates an example protocol stack 600 that facilitates the synchronization of uni-cast and multi-cast sequence numbers. Protocol stack 600 includes transport layer 615, data framing layer 622, uni-cast layer 614, multi-cast layer 613 and application layer 611. Transport layer 615 corresponds to a transport layer protocol, such as, for example, TCP or User Datagram Protocol ("UDP"). Lower layers of protocol stack 600 (not shown) can receive packets from a network and transfer the packets up to transport layer 615. On the other hand, transport layer 615 can receive packets from data framing layer 622 and transfer packets down to the lower layers for delivery onto the network. Data framing layer 622 corresponds to a framing protocol, such as, for example, X.224. Uni-cast and multi-cast packets can be framed using similar types of framing headers, such as, for example, an X.224. Using similar types of framing headers potentially makes recovery of missing packets more efficient as both uni-cast and multi-cast packets can be binary-identical.

Uni-cast layer 614 and multi-cast layer 613 operate together to synchronize the transfer of packets to and from application layer 611. Application layer 611 corresponds to one or more application layer processes, such as, for example, Generic Conference Control ("GCC") applications and/or T.120 applications. When a uni-cast packet, such as, for example, uni-cast packet 621, is transferred from transport layer 615 towards application layer 611, the uni-cast packet may first be received by multi-cast layer 613. Similarly, when a uni-cast packet, such as, for example, uni-cast packet 622, is transferred from application layer 611 towards transport layer 615, the uni-cast packet may first be received by multi-cast layer 613.

Accordingly, multi-cast layer 613 can preserve the causality of packets such that the transfer of uni-cast repair packets (or the transfer of uni-cast packets to computer systems that do not support multi-cast, such as, for example, leaf computer system 227) is appropriately synchronized with the transfer multi-cast packets. When a uni-cast packet is being transferred from transport layer 615 towards application layer 611, multi-cast layer 613 can ensure that the uni-cast packet is delivered to application layer 611 after a corresponding multi-cast packet (e.g., multi-cast packet 626) of the same priority. Similarly, when a uni-cast packet is being transferred from application layer 611 towards transport layer 615, multi-cast layer 613 can ensure that the uni-cast packet is delivered to data framing layer 622 after a corresponding multi-cast packet (e.g., multi-cast packet 627) of the same priority.

The method 400 includes an act of receiving repair conferencing data from the parent computer system (act 410). Act 410 can include a child computer system receiving repair conferencing data for repairing conferencing data that was not sufficiently received by the child computer system. Repair conferencing data can be received via uni-cast or multi-cast. For example, if intermediate computer system 212 received multi-cast packet 282 but leaf computer systems 222 did not, a TCP connection (e.g., that was created when the leaf computer system 222 joined electronic conference 270) can be re-used over link 243 to re-transmit conferencing data 252. This conserves network resources since no TCP connection need be established over link 241 to repair conferencing data at leaf computer system 222. Accordingly, embodiments of the present invention can more reliably deliver conferencing data through recovery via connection-oriented protocols, while still realizing potential bandwidth savings and reduced latency associated with multi-cast.

Figure 5:
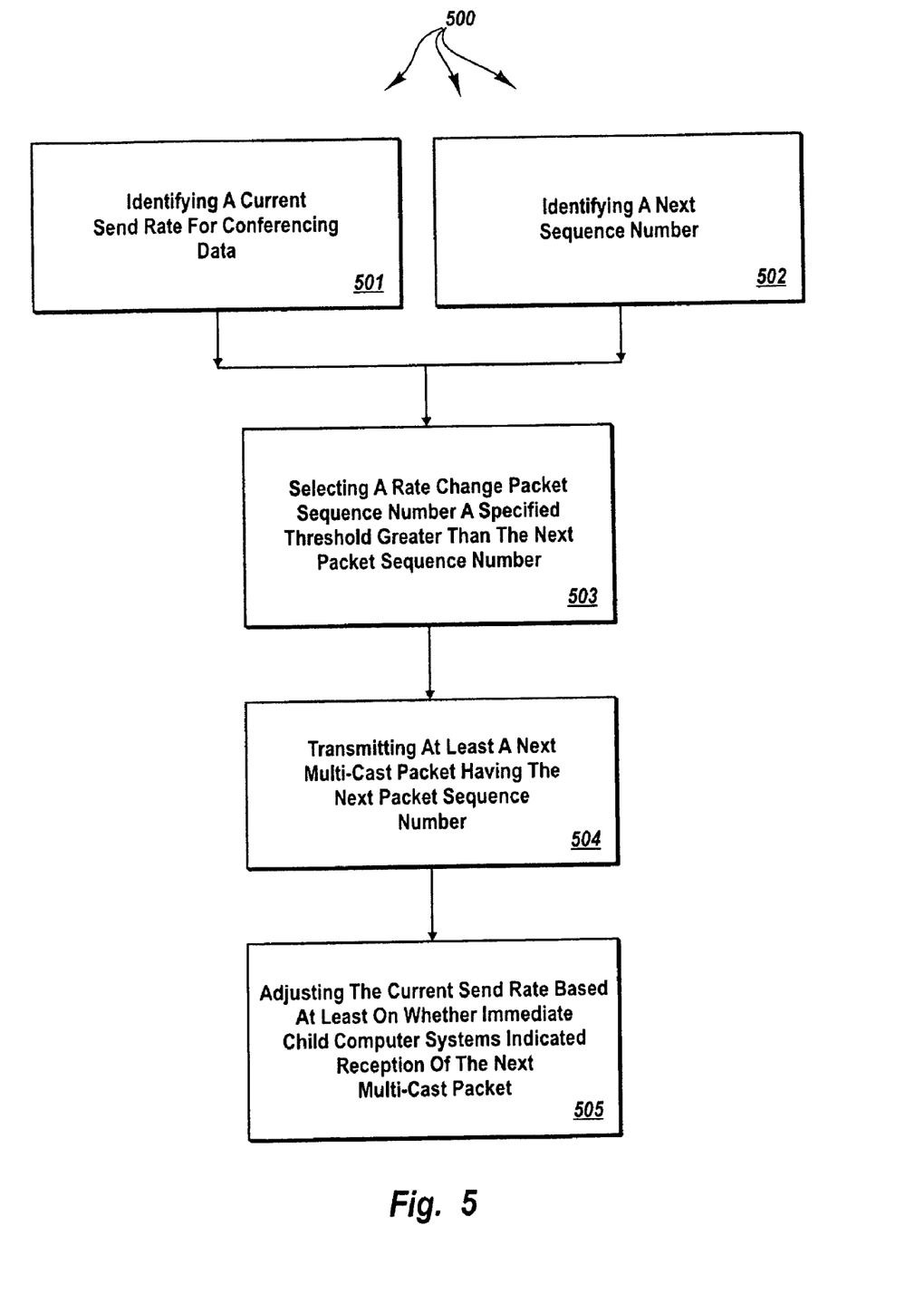
FIG. 5 illustrates an example flowchart of a method for adjusting a multi-cast send rate.

FIG. 5 illustrates an example flow chart of a method 500 for adjusting a multi-cast send rate. The method 500 will be described with respect to the computer systems in network architecture 200.

The method 500 includes an act of identifying a current send rate for conferencing data (act 501). Act 501 can include a root computer system identifying a current send rate (e.g., four kilobytes per second, ten kilobytes per second, one megabyte per second, etc.) for sending conferencing data to computer systems participating in a multi-cast session. The current send rate is a rate the root computer system will transmit conferencing data (e.g., by configuring a packet size and transmission interval) to other computer systems participating in the multi-cast conferencing session. For example, root computer system 202 can identify a current send rate for transmitting conferencing data to computer systems participating in multi-cast session 250. When a multi-cast session is initially established a current send rate can be an initial send rate having a decreased likelihood of causing congestion on links of a multi-cast session (e.g., links 241, 242, 243, 244, 245, and 246), such as, for example, one kilobyte per second.

The method 500 includes an act of identifying a next sequence number (502). Act 502 can include a root computer system identifying the next sequence number that is to be associated with the next transmitted multi-cast packet. For example, root computer system 202 can identifying the sequence number that is to be associated with the next multi-cast packet transmitted to computer systems participating in multi-cast session 250.

The method 500 includes an act of selecting a rate change packet sequence number a specified threshold greater than the next packet sequence number (act 503). Act 503 can include a root computer system selecting a rate change packet sequence number that indicates when the root computer system can potentially adjust the current send rate. For example, root computer system 202 can select a rate change sequence number that indicates when computer system 202 can potentially adjust the current send rate for multi-cast session 250.

A specified threshold (e.g. a specified number of packets) can be set so that the root computer system (e.g., computer system 202) has an opportunity to receive at least one acknowledgment message from each of the root computer system's immediate child computer systems (i.e., intermediate computer systems 212 and 213). Thus, an appropriate specified threshold can be set so that the difference of the next packet sequence number subtracted from the rate change packet sequence number is greater than the root computer system's ACK window parameter value. An appropriate specified threshold provides an interval for immediate child computer systems to send acknowledgment messages acknowledging all the multi-cast packets in a sequence of multi-cast packets received within the root computer system acknowledgment window. For example, if an ACK window parameter value were 5 (representing that an acknowledgment message is to be sent after the reception of every 5 multi-cast packets), a specified threshold could be set to at least 6 multi-cast packets. Accordingly, if a next sequence number were 17, a rate change packet sequence number could be set to at least 23.

The method 500 includes an act of transmitting at least a next multi-cast packet having the next packet sequence number (act 504). Act 504 can include a root computer system transmitting a next multi-cast packet in accordance with the current send rate. For example, root computer systems 202 can transmit a next multi-cast packet to computer system participating in multi-cast session 250 in accordance with the current send rate for multi-cast session 250. It may be that a sequence of multi-cast packets (e.g., packets within an acknowledgment window), including the next multi-cast packet and a rate change multi-cast packet having the rate change packet sequence number, is transmitted.

The method 500 includes an act of adjusting the send rate based at least on whether the one or more immediate child computer systems indicated reception of the next multi-cast packet (act 505). Act 505 can include a root computer system decreasing the current send rate in response to receiving a negative acknowledgment message (or no message at all) from an immediate child computer system. For example, root computer system 202 can decrease the current send rate for multi-cast session 250 in response to receiving a negative acknowledgment message from intermediate computer system 212 or 213. It may be that an immediate child computer system sends a negative acknowledge or is prevented from sending a message at all due to network congestion.

After a reduction in send rate, the root computer system can reset a rate change sequence number to verify that the decreased send rate is sustainable. When a root computer system receives negative acknowledgment messages from a plurality of immediate child computer systems, the root computer may decrease the current send rate the same amount it would have reduced the send rate if one negative acknowledgment was received. This reduces the potential of dropping the current send rate to a rate significantly below a sustainable send rate.

On the other hand, act 505 can include a root computer system increasing the current send rate in response to receiving acknowledgment messages from each immediate child computer system. For example, root computer system 202 can increase the current send rate for multi-cast session 250 in response to receiving acknowledgment messages from both intermediate computer system 212 and intermediate computer system 213. Accordingly, a root computer system can adjust a send rate to compensate for changes in the transmission characteristics (e.g., available bandwidth and latency) of networks used to deliver multi-cast packets.

A root computer system may increase and/or decrease a send rate by a predetermined amount based on a previous adjustment in send rate. Table 3 represents an example of how a send rate can be adjusted.

TABLE 3

| Previous Adjustment | To Increase | To Decrease |
|---|---|---|
| No Change | Double | Cut by Quarter/Linear Decrease |
| Double | Double | Cut by Half |
| Increase a Quarter | Increase a Quarter/Linear Increase | Cut by Quarter/Linear Decrease |
| Linear Increase | Increase a Quarter/Linear Increase | Linear Decrease |
| Cut by Half | Increase by a Quarter | Cut by Quarter/Linear Decrease |
| Cut by a Quarter | Increase by a Quarter | Cut by Quarter/Linear Decrease |
| Linear Decrease | Increase a Quarter/Linear Increase | Cut by Quarter/Linear Decrease |

When it is determined that a current send rate is to be adjusted, a previous adjustment is considered. For example, when it is determined that the send rate is to be increased (as a result of receiving appropriate acknowledgment messages) and a previous adjustment was cutting the send rate in half, the current send rate can be increased by a quarter. A no change previous adjustment can occur when adjusting an initial send rate.

The term "Increase By A Quarter/Linear Increase" represents that a current send rate can be increased by a quarter or a smaller amount (e.g., $1/16^{th}$). When a current send rate is less than the previously recorded highest send rate, the root computer system can increase the send rate by a quarter. Below a previously recorded highest send rate, increasing by a quarter may be appropriate since there is some confidence that an increased send rate near the previously recorded highest send rate will not cause network congestion. On the other hand, when a current send rate is greater than the previously recorded highest send rate, the root computer system can linearly increase the send rate. Above a previously recorded highest send rate, there may be no way to determine if an increased send rate will cause network congestion. Accordingly, a more conservative linear increase may be appropriate.

Similarly the term "Cut By A Quarter/Linear Decrease" represents that a current send rate can be decreased by a quarter or a smaller amount (e.g., $1/16^{th}$). When the number of lost multi-cast packets reported inside a negative acknowledgment message is less than a cutoff limit (e.g., 4 multi-cast packets), the root computer system can linearly decrease the current send rate. On the other hand, when the number of lost multi-cast packets reported inside a negative acknowledgment message is more than the cutoff limit, the root computer system decease the current send rate by a quarter. Use of a cutoff limit increases the chance of making an appropriate adjustment based on the severity of packet loss. When a decreased number of multi-cast packets are lost (e.g., 1 or 2), a linear decrease may sufficiently reduce network congestion enough to mitigate further packet loss. When an increased number of packets are lost, such as, for example, when a burst of packets are lost, a more significant decrease in the current send rate may be needed to sufficiently reduce network congestion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a parent computer system that is network connectable to one or more child computer systems, a method for inviting a child computer system of the one or more child computer systems to join a multi-cast session of a multi-cast root computer system, the method comprising:

accessing, by the parent computer system, a designated multi-cast address for the multi-cast session;

sending, by the parent computer system to the child computer system at the designated multi-cast address, a multi-cast invite message configured to invite the child computer system to join the multi-cast session, wherein the multi-cast invite message includes a session identifier that includes information comprising the designated multi-cast address, a network address of the multi-cast root computer system, and a designated multi-cast port, and wherein the child computer system is configured for receiving the sent multi-cast invite message and for joining the multi-cast session based on the information in the received multi-cast invite message, and for receiving a multi-cast packet of the multi-cast session at the designated multi-cast address in response to the joining, and for checking a source address of the received multi-cast packet of the multi-cast session, and for sending a multi-cast status message to the parent computer system in response to the source address matching the network address of the multi-cast root computer system, and for discarding the received multi-cast packet of the multi-cast session in response to the source address not matching the network address of the multi-cast root computer system;

receiving, by the parent computer system from the child computer system in response to the sent multi-cast invite message, the multi-cast status message indicating that the child computer system joined the multi-cast session based on the information in the sent multi-cast invite message and then received from the root computer system at least one multi-cast packet for the multi-cast session, wherein the root computer system is distinct from the parent computer system; and sending, by the parent computer system to the child computer system in response to the received multi-cast status message, a message that includes a next multi-cast sequence number associated with a next multi-cast packet of the multi-cast session, the message separate from the next multi-cast packet of the multi-cast session;

wherein the multi-cast root computer system sends the next multi-cast packet of the multi-cast session to the one or more child computer systems including the child computer system, and wherein the sent next multi-cast packet of the multi-cast session includes the next multi-cast sequence number and the network address of the multi-cast root computer system, and wherein the multi-cast session includes the parent computer system, the child computer system, and the multi-cast root computer system that sends conference data of the multi-cast session in multi-cast packets, including the next multi-cast packet, that are receivable by the one or more child computer systems.

2. The method as recited in claim 1, wherein the accessing the designated multi-cast address comprises receiving the designated multi-cast address previously provided by the multi-cast root computer system.

3. The method as recited in claim 1, wherein the accessing the designated multi-cast address comprises the parent computer system allocating the designated multi-cast address.

4. The method as recited in claim 1, wherein the multi-cast invite message is a multi-point communication service ("MSC") Connect-Initial message.

5. The method as recited in claim 1, wherein the receiving the multi-cast status message comprises receiving a message from the child computer system acknowledging successful receipt of a multi-cast packet that was transmitted by the multi-cast root computer system to computer systems participating in the multi-cast conference session.

6. A method performed by a computing system, the method comprising:

receiving, by the computer system from a parent computer system, a multi-cast invite message to invite the computer system to join a multi-cast session, wherein the multi-cast invite message includes a session identifier for the multi-cast session, and wherein the session identifier includes information comprising a designated multi-cast address, a network address of a multi-cast sender, and a designated multi-cast port;

joining, by the computer system in response to the received multi-cast invite message, the multi-cast session based on the information in the received multi-cast invite message;

receiving, by the computer system from the multi-cast sender in response to the joining, a multi-cast packet of the multi-cast session at the designated multi-cast address, wherein the multi-cast sender is a root computer system that is distinct from the parent computer system;

checking, by the computer system in response to the received multi-cast packet, a source address of the received multi-cast packet and, if the source address does not match the network address of the multi-cast sender, then discarding the multi-cast packet, and if the source address does match the network address of the multi-cast sender, then:

sending, by the computer system to the parent computer system, a multi-cast status message indicating that the computer system joined the multi-cast session based on the information in the received multi-cast invite message and then received from the root computer system the multi-cast packet for the multi-cast conference session; and receiving, by the computer system from the parent computer system in response to the sent multi-cast status message, a message that includes a next multi-cast sequence number associated with a next multi-cast packet of the multi-cast session, the message separate from the next multi-cast packet of the multi-cast session;

wherein the multi-cast session includes the parent computer system, the computer, and the root computer system that sends conference data of the multi-cast session in multi-cast packets, including the next multi-cast packet, that are receivable by the computer system.

7. The method as recited in claim 6, wherein the multi-cast session is a T.120 electronic conference.

8. The method as recited in claim 6, wherein if the child computer system does not support multi-cast then the child computer system participates in the multi-cast session via uni-cast.

9. The method as recited in claim 6, wherein the child computer system is a leaf computer system and the multi-cast root computer system is a root computer system and the parent computer system is not the root computer system and wherein the child computer system joins the multi-cast session without sending data to the multi-cast root computer system.

10. The method as recited in claim 7, wherein the multi-cast session is a T.120 electronic conference.

11. The method as recited in claim 7, wherein if the child computer system does not support multi-cast then the child computer system participates in the multi-cast session via uni-cast.

12. The method as recited in claim 7, wherein the child computer system is a leaf computer system and the multi-cast sender is a root computer system and the parent computer system is not the root computer system and wherein the child computer system joins the multi-cast session without sending data to the multi-cast sender.

* * * * *